(12) United States Patent
Riedisser et al.

(10) Patent No.: US 11,174,933 B2
(45) Date of Patent: Nov. 16, 2021

(54) TRANSMISSION FOR A MOTOR VEHICLE

(71) Applicant: ZF Friedrichshafen AG, Friedrichshafen (DE)

(72) Inventors: Thomas Riedisser, Sigmarszell (DE); Kim Führer, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 197 days.

(21) Appl. No.: 16/471,695

(22) PCT Filed: Nov. 27, 2017

(86) PCT No.: PCT/EP2017/080463
§ 371 (c)(1),
(2) Date: Jun. 20, 2019

(87) PCT Pub. No.: WO2018/114228
PCT Pub. Date: Jun. 28, 2018

(65) Prior Publication Data
US 2019/0383381 A1 Dec. 19, 2019

(30) Foreign Application Priority Data
Dec. 22, 2016 (DE) ...................... 10 2016 225 972.5

(51) Int. Cl.
*F16H 57/021* (2012.01)
*B60K 6/48* (2007.10)
(Continued)

(52) U.S. Cl.
CPC ............ *F16H 57/021* (2013.01); *B60K 6/48* (2013.01); *F16H 3/44* (2013.01); *F16H 3/72* (2013.01);
(Continued)

(58) Field of Classification Search
None
See application file for complete search history.

(56) References Cited

U.S. PATENT DOCUMENTS

| 8,545,355 | B2 * | 10/2013 | Frait | ........................ | B60K 6/40 |
| | | | | | 475/149 |
| 10,465,790 | B2 * | 11/2019 | Cudok | ..................... | B60K 6/48 |

(Continued)

FOREIGN PATENT DOCUMENTS

| DE | 102007024126 A1 | 12/2008 |
| DE | 102008040498 A1 | 1/2010 |

(Continued)

OTHER PUBLICATIONS

German Search Report DE102016225972.5, dated Aug. 17, 2017. (12 pages).

(Continued)

*Primary Examiner* — Dirk Wright
(74) *Attorney, Agent, or Firm* — Dority & Manning, P.A.

(57) ABSTRACT

A transmission for a motor vehicle has an input shaft, an output shaft, a ratio-changing device by which different transmission ratios are made available, a housing, a hub connected to a torsional damper, and a separating clutch including a first clutch half and a second clutch half. The hub is connected to the first clutch half. The input shaft is rotationally fixed to the second clutch half and extends axially into the ratio-changing device. A first axial end of the input shaft is directly or indirectly supported on the housing in a radial direction via a first bearing. A second axial end of the input shaft is supported directly on the hub in the radial direction via a second bearing. Additionally, the hub is directly supported on a bearing shield in the radial direction via a third bearing, the bearing shield being rotationally fixed to the housing.

18 Claims, 4 Drawing Sheets

(51) Int. Cl.
*F16H 3/44* (2006.01)
*F16H 3/72* (2006.01)
*F16H 57/02* (2012.01)

(52) U.S. Cl.
CPC .............. *B60K 2006/4825* (2013.01); *F16H 2057/0216* (2013.01); *F16H 2057/02034* (2013.01)

(56) References Cited

U.S. PATENT DOCUMENTS

| | | |
|---|---|---|
| 10,843,547 B2 * | 11/2020 | Walter ................ F16H 9/16 |
| 2011/0124455 A1 | 5/2011 | Borntraeger et al. |
| 2013/0086798 A1 | 4/2013 | Frait et al. |
| 2017/0037955 A1 | 2/2017 | Cudok et al. |

FOREIGN PATENT DOCUMENTS

| | | |
|---|---|---|
| DE | 102011078110 A1 | 12/2012 |
| DE | 102014202621 A1 | 8/2015 |
| DE | 102014206844 A1 | 10/2015 |
| DE | 102014014669 A1 | 4/2016 |
| WO | WO 2008/141876 | 11/2008 |

OTHER PUBLICATIONS

International Search Report PCT/EP2017/080463, dated Feb. 23, 2018. (3 pages).

\* cited by examiner

TRANSMISSION FOR A MOTOR VEHICLE

FIELD OF THE INVENTION

The invention relates generally to a transmission for a motor vehicle, and to a drive train for a motor vehicle having such a transmission. In this case, a transmission refers, in particular, to a multi-stage transmission, in which a multitude of gears, i.e., fixed translation ratios between the input shaft and the output shaft of the transmission, are preferably automatically shiftable with the aid of shift elements. In this case, the shift elements are clutches or brakes, for example. Such transmissions are utilized primarily in motor vehicles in order to adapt the rotational speed and torque output characteristic of the drive unit to the driving resistances of the vehicle.

BACKGROUND

Patent application DE 10 2008 040 498 A1, which belongs to the applicant, describes a hybrid drive train of a motor vehicle, wherein a hybrid module is connected upstream from an automatic transmission. The hybrid module has a torsional vibration damper, an electric machine, an input transmission stage, and a separating clutch. The rotor of the electric machine is rotatably mounted, with respect to the module housing, on an output shaft of the hybrid module or on a planet carrier of the input transmission stage via a double-shear mounting.

Such a mounting of the electric machine in the hybrid module results in different axes of rotation of the electric machine and the downstream transmission. Depending on the coupling between the hybrid module and the downstream transmission, an overspecified mounting results, which shortens the service life of the involved components.

Patent application DE 10 2014 202 621 A1, which belongs to the applicant, provides a hybrid module as the solution to this problem to be addressed, wherein the rotor is supported in the radial direction with respect to a housing and on a transmission shaft. The transmission shaft is supported in the axial direction in the housing and radially via two bearing points on a rotationally fixed support shaft. The input shaft of the hybrid module, which is provided with a torsional damper, is independently supported via two antifriction bearings, however, and so an axial offset between the input shaft and the transmission shaft occurs, which negatively influences the service life of the multi-disk clutch arranged between the input shaft and the output shaft.

The problem addressed by the invention is therefore that of providing a transmission with an improved mounting as compared to the prior art.

SUMMARY OF THE INVENTION

A transmission for a motor vehicle is provided, which is configured for making different transmission ratios between an input shaft and an output shaft of the transmission available with the aid of a ratio-changing device. The transmission also has a housing, a hub connected to a torsional damper, and a separating clutch having a first clutch half and a second clutch half. The hub is connected to the first clutch half. The second clutch half is connected to the input shaft. The input shaft extends in the axial direction into the ratio-changing device. The ratio-changing device is formed, for example, by gear-implementing planetary gear sets and shift elements cooperating with the planetary gear sets.

According to the invention, a first axial end of the input shaft is directly or indirectly supported on the housing in the radial direction via a first bearing. A second axial end of the input shaft is directly supported on the hub in the radial direction via a second bearing. The hub is directly supported on a bearing shield, which is rotationally fixed to the housing, in the radial direction via a third bearing. As a result, an axial offset between the hub and the input shaft is avoided.

In the case of a direct support, there is no other component located between the particular elements except for the bearing. In the case of an indirect support, there is one further element or there are multiple further elements arranged between the particular elements. For example, the input shaft is supported at its first axial end directly on the housing, or indirectly via an intermediate connection of, for example, the output shaft and one further bearing.

According to one preferred embodiment, the first clutch half is connected to the hub in a rotationally fixed manner or via the second torsional damper.

Preferably, the second clutch half or a component rotationally fixed to the second clutch half is rotationally fixed to the input shaft via a spline. Since the spline, in the unloaded condition, permits an axial displacement, such an embodiment compensates for the axial position tolerance between the input shaft and the second clutch half.

Moreover, the hub is preferably directly supported, via a radial bearing, on the second clutch half or on the component rotationally fixed to the second clutch half. As a result, the hub is supported on the input shaft against tilting.

In the axial direction, the second clutch half or the component rotationally fixed to the second clutch half is preferably supported between the hub and the housing. The connection to the housing preferably takes place indirectly in this case, i.e., via an intermediate connection of further components of the transmission.

According to one preferred embodiment, the transmission includes an electric machine including a rotationally fixed stator and a rotary rotor. The rotor is either permanently rotationally fixed to the input shaft or is operatively connected to the input shaft via a fixed transmission ratio. The rotor is supported in the radial direction on the input shaft via an element which is rotationally fixed to the rotor, preferably exclusively.

If the rotor is permanently rotationally fixed to the input shaft, the element which is rotationally fixed to the rotor is preferably supported in the radial direction on the input shaft via a spline as well as via a centering seat. This is preferably the same spline, with the aid of which the second clutch half is connected to the input shaft. In other words, the rotor is rotationally fixed to the second clutch half. If the rotor is operatively connected to the input shaft via a fixed transmission ratio, the element which is rotationally fixed to the rotor is preferably supported on the input shaft in the radial direction via two bearings.

If the rotor is operatively connected to the input shaft via a fixed transmission ratio, the second clutch half is preferably supported on the element which is rotationally fixed to the rotor via an additional radial bearing.

If the rotor is operatively connected to the input shaft via a fixed transmission ratio, the rotor is preferably supported in the axial direction between the second clutch half, or the component which is rotationally fixed to the second clutch half, and the housing. The connection to the housing preferably takes place indirectly in this case, i.e., via an intermediate connection of further components of the transmission.

Preferably, the fixed transmission ratio between the rotor and the input shaft is made available with the aid of a planetary gear set, the planet carrier of which is supported on the input shaft via a spline. Due to this support, the planet carrier is both rotationally fixed to the input shaft as well as radially supported thereon.

The input shaft is optionally supported with respect to the housing via a support bearing. The support bearing is arranged axially between the first bearing and the second bearing. Due to such a support bearing, a sagging of the input shaft is limited, particularly in the case of a long input shaft. The support via the support bearing with respect to the housing preferably takes place via a second bearing shield which is connected to the housing.

According to one preferred embodiment, the first bearing, the second bearing, or each of the first bearing and the second bearing is a plain bearing. Each plain bearing is preferably hydrostatically lubricated with the aid of lubrication pressure present in the housing. Alternatively, the first plain bearing, the second bearing, or each of the first bearing and the second bearing is a needle sleeve including an integrated seal. Preferably, the bearing shield is connected to the housing with the aid of three screws. As a result, an axial and a radial flexibility of the bearing shield can be considerably reduced.

The transmission can be an integral part of a drive train of a motor vehicle. The drive train has, in addition to the transmission, an internal combustion engine which is flexibly connected to the hub of the transmission via the at least one torsional damper. The output shaft of the transmission is drivingly operatively connected to a transmission-internal or transmission-external differential gear which is operatively connected to wheels of the motor vehicle. If the transmission includes the electric machine, the drive train allows for multiple drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by the internal combustion engine as well as the electric machine of the transmission.

BRIEF DESCRIPTION OF THE FIGURES

Exemplary embodiments of the invention are described in detail in the following with reference to the attached figures. In the drawings, the following is shown.

DETAILED DESCRIPTION

Figure 1:
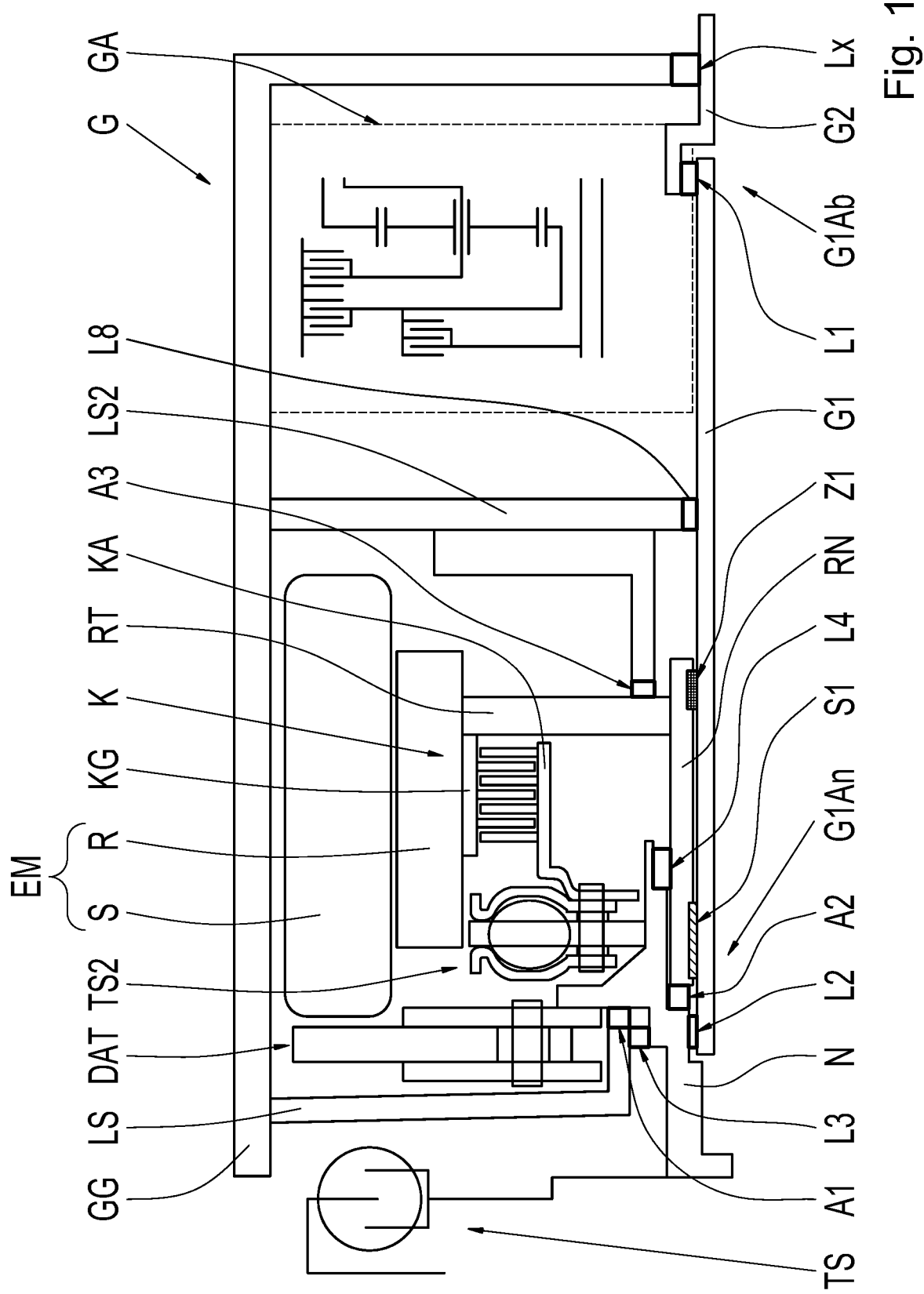
FIG. 1 illustrates a schematic view of a first exemplary embodiment of a transmission in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a first exemplary embodiment of a transmission G. The transmission G includes an input shaft G1, an output shaft G2, and a ratio-changing device GA which is indicated in FIG. 1 with a dashed box. The ratio-changing device GA is configured for making different transmission ratios between the input shaft G1 and the output shaft G2 available, for example with the aid of planetary gear sets and shift elements cooperating with the planetary gear sets.

Moreover, the transmission G includes a housing GG, a hub N, a separating clutch K including a first clutch half KA and a second clutch half KG, as well as an electric machine EM including a stator S, which is rotationally fixed with respect to the housing GG, and a rotary rotor R. The separating clutch K is, for example, a wet-running multi-disk clutch which is actuated with the aid of a suitable actuating unit (not shown in FIG. 1), for example with the aid of a hydraulically actuatable piston. The hub N is connected to a torsional damper TS and is connected to the first clutch half KA via an optional second torsional damper TS2. Moreover, a pendulum absorber DAT is attached to the hub N. The clutch K, the pendulum absorber DAT, and the second torsional damper TS2 are located in the wet space of the transmission G, while the torsional damper TS is arranged in a dry space. The wet space and the dry space are separated by a bearing shield LS which is connected to the housing GG with the aid of three screws (not shown). The second clutch half KG is permanently rotationally fixed to the input shaft G1 via the rotor R, a rotor carrier RT, and a rotor hub RN.

A first axial end G1Ab of the input shaft G1 is indirectly supported on the housing GG in the radial direction via a first radial bearing L1. The indirect support takes place, for example, via the output shaft G2 which is rotatably mounted on the housing GG via a bearing Lx. The first axial end G1Ab of the input shaft G1 extends axially into the ratio-changing device GA. Alternatively, the input shaft G1 could be directly supported on the housing GG at the axial end G1Ab in the radial direction via the first bearing L1.

A second axial end G1An of the input shaft G1 is directly supported on the hub N in the radial direction via a second radial bearing L2. The hub N is directly supported on the bearing shield LS in the radial direction via a third radial bearing L3.

Optionally, an additional support bearing L8 is provided, which supports the input shaft G1 with respect to a second bearing shield LS2. The second bearing shield LS2 is connected to the housing GG. Due to such a support bearing L8, a sagging of the input shaft G1 is limited, particularly in the case of a long input shaft G1.

The rotor R and the second clutch half KG are connected to each other in a rotationally fixed manner, such that the support of the second clutch half KG takes place via the rotor R, the rotor carrier RT rotationally fixed to the rotor R, and the rotor hub RN rotationally fixed to the rotor carrier RT. This rotationally fixed connection between the rotor hub RN and the input shaft G1 takes place via a spline S1 which also acts as a mounting of the rotor R. The assembly having the rotor R, the rotor carrier RT, and the rotor hub RN is additionally supported on the input shaft G1 via a centering seat Z1. The hub N is also directly supported on the second clutch half KG via a fourth radial bearing L4. In the axial direction, the assembly having the rotor R, the rotor carrier RT, and the rotor hub RN is axially supported between the hub N and the second bearing shield LS2. The axial support takes place via a second axial bearing A2 and a third axial bearing A3. The hub N is axially supported between the bearing shield LS and the rotor hub RN, wherein the support takes place via the second axial bearing A2 and a first axial bearing A1.

The electric machine EM in the first exemplary embodiment is merely an optional integral part of the transmission G. When the electric machine EM is not integral, the second clutch half KG is connected to the input shaft G1, for example, via a clutch carrier rather than via the rotor carrier RT.

Figure 2:
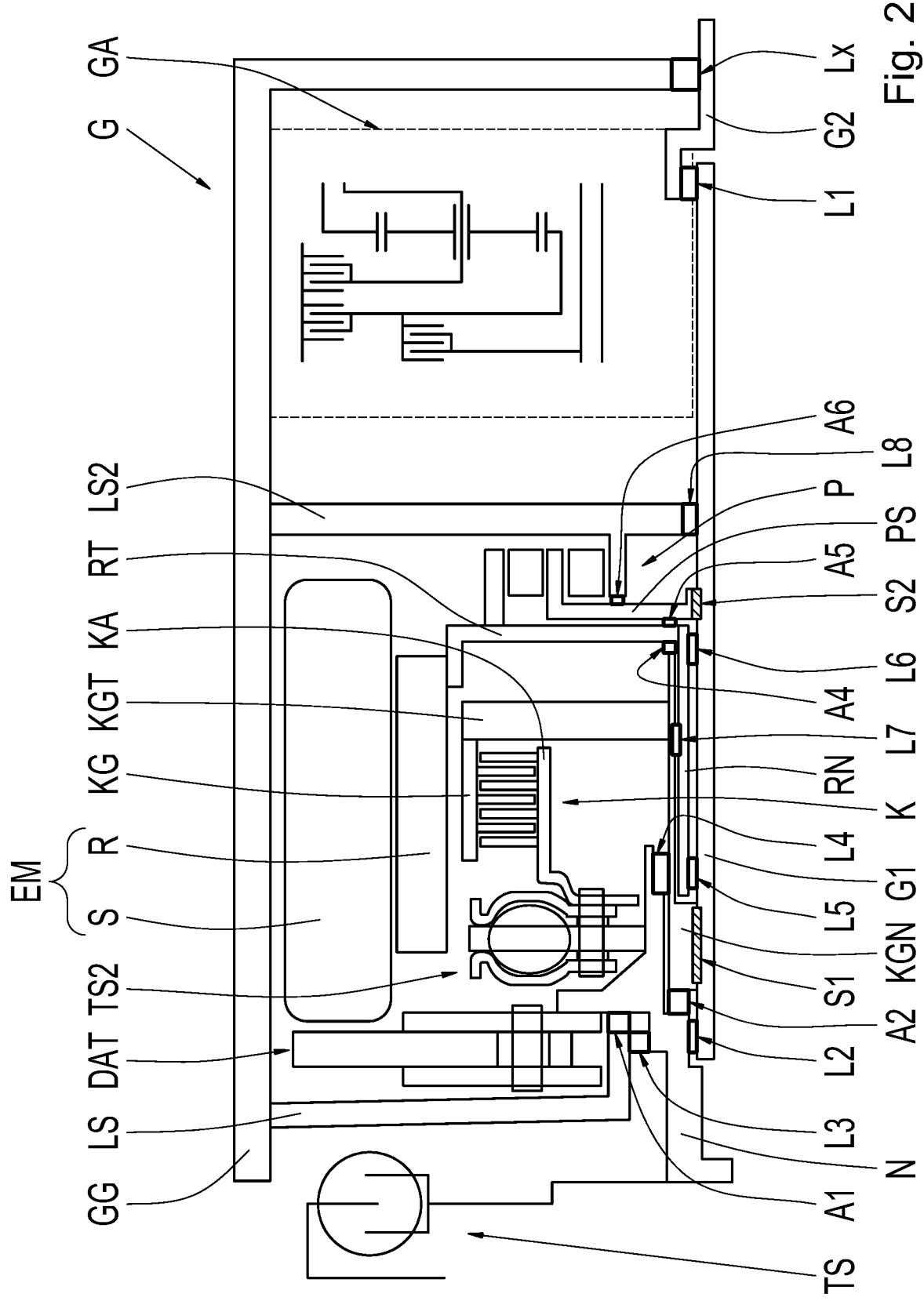
FIG. 2 illustrates a schematic view of a second exemplary embodiment of a transmission in accordance with aspects of the present subject matter.

FIG. 2 shows a schematic view of a second exemplary embodiment of the transmission G, which essentially corresponds to the first exemplary embodiment represented in FIG. 1, except that the rotor R is connected to the input shaft G1 via a fixed transmission ratio which is made available with the aid of a planetary gear set P. For this purpose, a sun gear of the planetary gear set P is rotationally fixed with respect to the second bearing shield L2, a ring gear is connected to the rotor R via the rotor carrier RT, and a planet carrier PS is rotationally fixed to the input shaft G1 via a spline S2. The second clutch half KG is now no longer connected to the rotor R. Instead, the second clutch half KG is rotationally fixed to a clutch carrier KGT, wherein the clutch carrier KGT is rotationally fixed to a clutch hub KGN. The clutch carrier KGT and the clutch hub KGN are formed as one part or, for example, are welded together. The second clutch half KG is formed as one part with the clutch carrier KGT.

The clutch hub KGN is connected to the input shaft G1 via the first spline S1 and is supported on the rotor hub RN via an additional radial bearing L7. The rotor hub RN is supported on the input shaft G1 in the radial direction via a fifth radial bearing L5 and a sixth radial bearing L6. The clutch hub KGN is supported axially between the hub N and the rotor carrier RT via the axial bearing A2 and a fourth axial bearing A4. The rotor carrier RT is supported axially between the clutch hub KGN and the planet carrier PS, wherein the support takes place between the fourth axial bearing A4 and a fifth axial bearing A5. The planet carrier PS is axially supported between the rotor carrier RT and the second bearing shield LS2, wherein the support takes place between the fifth axial bearing A5 and a sixth axial bearing A6. The sun gear of the planetary gear set P is located in the power path of this axial support.

Figure 3:
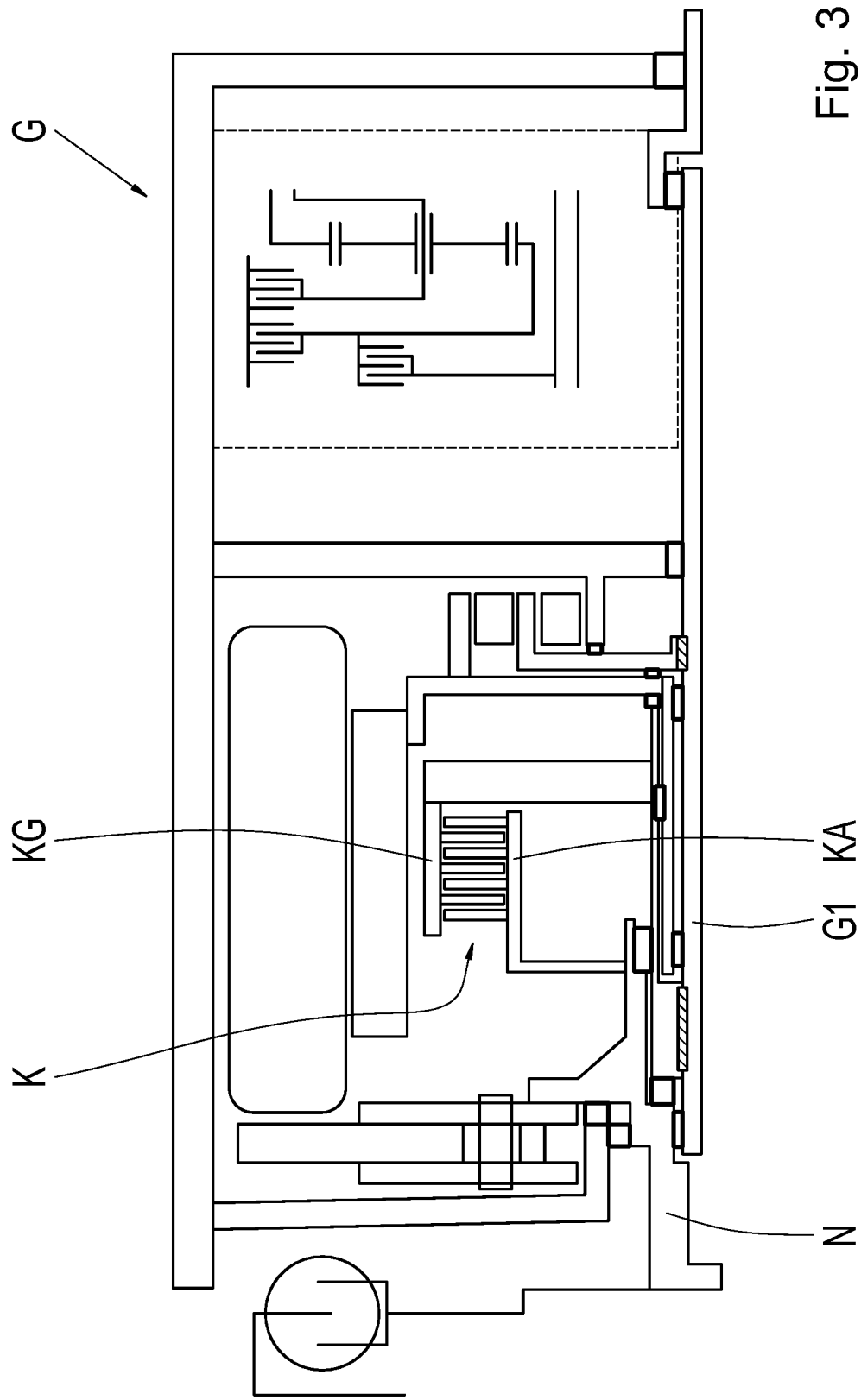
FIG. 3 illustrates a schematic view of a third exemplary embodiment of a transmission in accordance with aspects of the present subject matter.

FIG. 3 shows a schematic view of a third exemplary embodiment of the transmission G, which essentially corresponds to the second exemplary embodiment represented in FIG. 2, except that the first clutch half KA is now directly connected to the hub N, such that the second torsional damper TS2 is dispensed with.

In all exemplary embodiments, the bearing configuration of the transmission G is not represented in entirety. Additional bearings are necessary, in particular, in the area of the ratio-changing device GA. The radial support of the input shaft G1 is represented in entirety.

Figure 4:
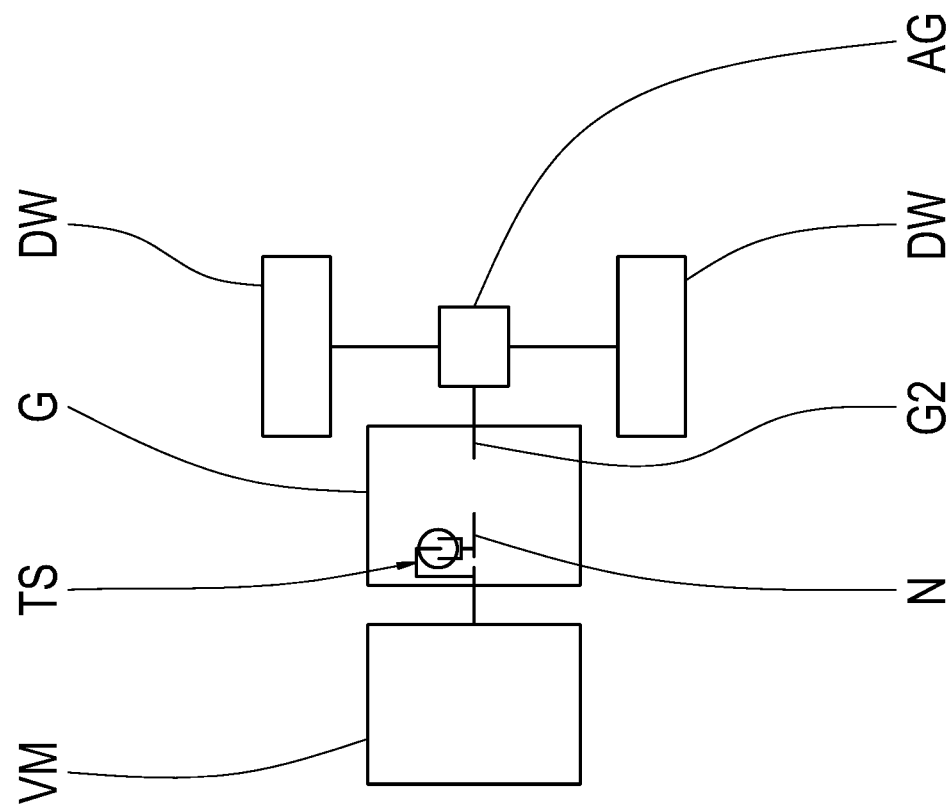
FIG. 4 illustrates a schematic view of one embodiment of a motor vehicle drive train.

FIG. 4 shows one embodiment of a drive train of a motor vehicle having an internal combustion engine VM and a downstream transmission G. The drive train is aligned in parallel to the direction of travel of the motor vehicle. The internal combustion engine VM is connected via the torsional damper TS to the hub N of the transmission G. The output shaft G2 of the transmission G is connected to a transmission-external differential gear AG, via which the power present at the output shaft G2 is distributed to driving wheels DW.

Figure 5:
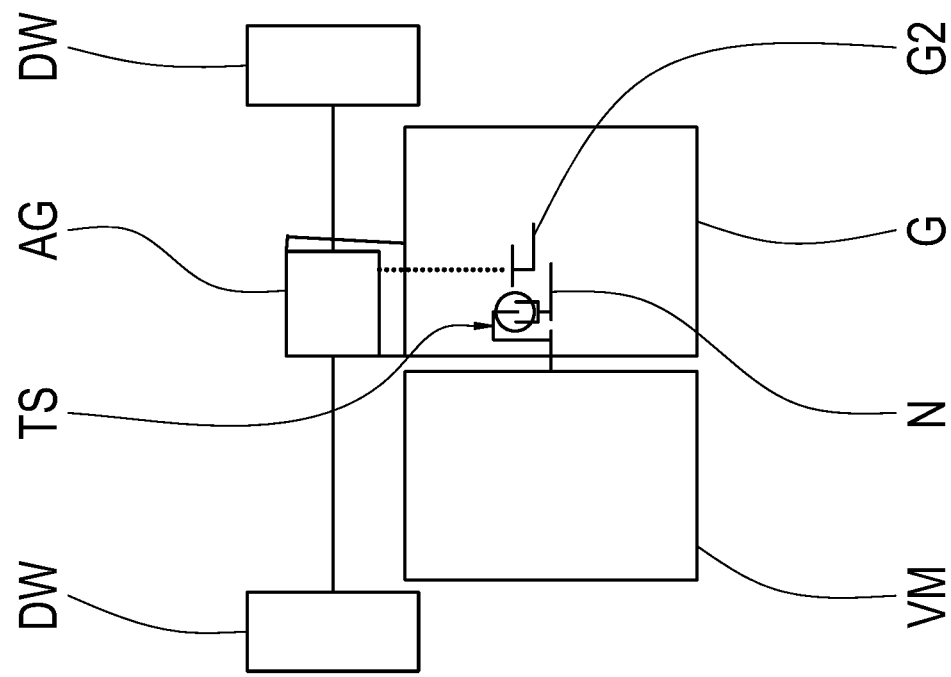
FIG. 5 illustrates a schematic view of another embodiment of a motor vehicle drive train.

FIG. 5 shows another embodiment of a drive train of a motor vehicle, with the drive train being aligned transversely to the direction of travel of the motor vehicle. The internal combustion engine VM is connected via the torsional damper TS to the hub N of the transmission G. The output shaft G2 of the transmission G is operatively connected to a transmission-internal differential gear AG which is arranged axially parallel to the output shaft G2. The power present at the output shaft G2 is distributed to driving wheels DW via the differential gear AG.

Modifications and variations can be made to the embodiments illustrated or described herein without departing from the scope and spirit of the invention as set forth in the appended claims.

REFERENCE CHARACTERS

G transmission
G1 input shaft
G1Ab first axial end of the input shaft
G1An second axial end of the input shaft
G2 output shaft
GA ratio-changing device
GG housing
LS bearing shield
LS2 second bearing shield
N hub
TS torsional damper
TS2 second torsional damper
DAT pendulum absorber
K separating clutch
KA first clutch half
KG second clutch half
KGT clutch carrier
KGN clutch hub
EM electric machine
R rotor
RT rotor carrier
RN rotor hub
S stator
L1 first radial bearing
Lx bearing
L2 second radial bearing
L3 third radial bearing
L4 fourth radial bearing
L5 fifth radial bearing
L6 sixth radial bearing
L7 additional radial bearing
L8 support bearing
S1 spline
S2 second spline
Z1 centering seat
A1 first axial bearing
A2 second axial bearing
A3 third axial bearing
A4 fourth axial bearing
A5 fifth axial bearing
A6 sixth axial bearing
P planetary gear set
PS planet carrier
VM internal combustion engine
AG differential gear
DW driving wheel

The invention claimed is:

1. A transmission (G) for a motor vehicle, comprising:
an input shaft (G1);
an output shaft (G2);
a ratio-changing device (GA);
a housing (GG);
a hub (N) connected to a torsional damper (TS); and
a separating clutch (K) including a first clutch half (KA) and a second clutch half (KG),
wherein different transmission ratios are made available via the ratio-changing device (GA),
wherein the hub (N) is connected to the first clutch half (KA) via a second torsional damper (TS2),
wherein the input shaft (G1) is rotationally fixed to the second clutch half (KG),
wherein the input shaft (G1) extends axially into the ratio-changing device (GA),
wherein a first axial end (G1Ab) of the input shaft (G1) is directly or indirectly supported on the housing (GG) in a radial direction via a first bearing (L1),
wherein a second axial end (G1An) of the input shaft (G1) is supported directly on the hub (N) in the radial direction via a second bearing (L2), and
wherein the hub (N) is directly supported on a bearing shield (LS) in the radial direction via a third bearing (L3), the bearing shield (LS) being rotationally fixed to the housing (GG).

2. The transmission (G) of claim 1, wherein the second clutch half (KG) or a component rotationally fixed to the second clutch half (KG) is rotationally fixed to the input shaft (G1) via a spline (S1).

3. The transmission (G) of claim 2, wherein the hub (N) is supported on the second clutch half (KG) or on the component rotationally fixed to the second clutch half (KG) half via a fourth bearing (L4).

4. The transmission (G) of claim 2, wherein the second clutch half (KG) or the component rotationally fixed to the second clutch half (KG) is supported in an axial direction between the hub (N) and the housing (GG).

5. The transmission (G) of claim 1, further comprising an electric machine (EM) including a rotary rotor (R) and a rotationally fixed stator (S), wherein the rotor (R) is either permanently rotationally fixed to the input shaft (G1) or is operatively connected to the input shaft (G1) via a fixed transmission ratio, and wherein the rotor (R) is supported on the input shaft (G1) in the radial direction via an element (RN), the element (RN) being rotationally fixed to the rotor (R).

6. The transmission (G) of claim 5, wherein the rotor (R) is supported in the radial direction exclusively on the input shaft (G1).

7. The transmission (G) of claim 5, wherein the rotor (R) is permanently rotationally fixed to the input shaft (G1), wherein the element (RN), which is rotationally fixed to the rotor (R), is supported in the radial direction on the input shaft (G1) via a spline (S1) and via a centering seat (Z1).

8. The transmission (G) of claim 5, wherein the rotor (R) is operatively connected to the input shaft (G1) via a fixed transmission ratio, wherein the element (RN), which is rotationally fixed to the rotor (R), is supported in the radial direction on the input shaft (G1) via a fifth bearing (L5) and a sixth bearing (L6).

9. The transmission (G) of claim 8, wherein the second clutch half (KG) is supported on the element (RN), which is rotationally fixed to the rotor (R), via an additional radial bearing (L7).

10. The transmission (G) of claim 8, wherein the rotor (R) is supported in an axial direction between the second clutch half (KG) or the component rotationally fixed to the second clutch half (KG) and the housing (GG).

11. The transmission (G) of claim 8, wherein the fixed transmission ratio between the rotor (R) and the input shaft (G1) is made available with the aid of a planetary gear set (P), a planet carrier (PS) of the planetary gear set (P) being supported on the input shaft (G1) via a spline (S2).

12. The transmission (G) of claim 1, wherein the input shaft (G1) is supported with respect to the housing (GG) via a support bearing (L8), wherein the support bearing (L8) is arranged axially between the first bearing (L1) and the second bearing (L2).

13. The transmission (G) of claim 1, wherein the first bearing (L1), the second bearing (L2), or each of the first bearing and the second bearing (L1) is a plain bearing or a needle sleeve including an integrated seal.

14. The transmission (G) of claim 1, wherein the bearing shield (LS) is connected to the housing (GG) via three screws.

15. A drive train for a motor vehicle, comprising the transmission (G) of claim 1.

16. A transmission (G) for a motor vehicle, comprising:
an input shaft (G1);
an output shaft (G2);
a ratio-changing device (GA);
a housing (GG);
a hub (N) connected to a torsional damper (TS); and
a separating clutch (K) including a first clutch half (KA) and a second clutch half (KG),
wherein different transmission ratios are made available via the ratio-changing device (GA),
wherein the hub (N) is connected to the first clutch half (KA),
wherein the input shaft (G1) is rotationally fixed to the second clutch half (KG),
wherein the input shaft (G1) extends axially into the ratio-changing device (GA),
wherein a first axial end (G1Ab) of the input shaft (G1) is directly or indirectly supported on the housing (GG) in a radial direction via a first bearing (L1),
wherein a second axial end (G1An) of the input shaft (G1) is supported directly on the hub (N) in the radial direction via a second bearing (L2),
wherein the hub (N) is directly supported on a bearing shield (LS) in the radial direction via a third bearing (L3), the bearing shield (LS) being rotationally fixed to the housing (GG),
wherein the second clutch half (KG) or a component rotationally fixed to the second clutch half (KG) is rotationally fixed to the input shaft (G1) via a spline (S1), and
wherein the hub (N) is supported on the second clutch half (KG) or on the component rotationally fixed to the second clutch half (KG) half via a fourth bearing (L4).

17. The transmission (G) of claim 16, wherein the hub (N) is radially supported via the fourth bearing (L4).

18. A transmission (G) for a motor vehicle, comprising:
an input shaft (G1);
an output shaft (G2);
a ratio-changing device (GA);
a housing (GG);
a hub (N) connected to a torsional damper (TS);
a separating clutch (K) including a first clutch half (KA) and a second clutch half (KG), and an electric machine (EM) including a rotary rotor (R) and a rotationally fixed stator (S), wherein different transmission ratios are made available via the ratio-changing device (GA), wherein the hub (N) is connected to the first clutch half (KA), wherein the input shaft (G1) is rotationally fixed to the second clutch half (KG), wherein the input shaft (G1) extends axially into the ratio-changing device (GA), wherein a first axial end (G1Ab) of the input shaft (G1) is directly or indirectly supported on the housing (GG) in a radial direction via a first bearing (L1), wherein a second axial end (G1An) of the input shaft (G1) is supported directly on the hub (N) in the radial direction via a second bearing (L2), wherein the hub (N) is directly supported on a bearing shield (LS) in the radial direction via a third bearing (L3), the bearing shield (LS) being rotationally fixed to the housing (GG), wherein the rotor (R) is operatively connected to the input shaft (G1) via a fixed transmission ratio, wherein the rotor (R) is supported on the input shaft (G1) in the radial direction via an element (RN), and wherein the element (RN) is rotationally fixed to the rotor (R) and is supported in the radial direction on the input shaft (G1) via a fifth bearing (L5) and a sixth bearing (L6).

* * * * *